United States Patent [19]
Papasian

[11] 3,761,115
[45] Sept. 25, 1973

[54] SWIVEL CONNECTOR
[76] Inventor: Thomas Papasian, 5817 214th St., Bayside, N.Y. 11364
[22] Filed: July 28, 1971
[21] Appl. No.: 165,633

[52] U.S. Cl. ............ 285/185, 285/264, 285/DIG. 8
[51] Int. Cl. ............................................. F16l 27/00
[58] Field of Search ................ 285/185, 261, 264, 285/272, DIG. 8, 184, 262; 174/86

[56] References Cited
UNITED STATES PATENTS

| | | | |
|---|---|---|---|
| 1,123,839 | 1/1915 | Bridges | 285/39 X |
| 1,162,527 | 11/1915 | Tabbert | 285/261 |
| 1,301,453 | 4/1919 | Kendall | 285/185 |
| 2,489,100 | 11/1949 | Marco | 285/184 |
| 2,831,709 | 4/1958 | Show et al. | 285/185 |

FOREIGN PATENTS OR APPLICATIONS

| | | | |
|---|---|---|---|
| 165,423 | 11/1953 | Australia | 285/272 |
| 515,777 | 12/1952 | Belgium | 285/184 |

*Primary Examiner*—Dave W. Arola
*Attorney*—John J. McGlew et al.

[57] ABSTRACT

A swivel connector particularly for the passage of electrical cable elements therethrough includes first and second conduit parts having separate conduits with respective passages therethrough and bodies with mating surfaces which interengage and permit pivotal or swivel movement of one conduit part in respect to the other. The conduit parts are held together by clamping means which extend through a plane which is offset from the passages defined through the individual conduits when they are aligned.

10 Claims, 11 Drawing Figures

PATENTED SEP 25 1973 3,761,115

INVENTOR.
THOMAS PAPASIAN
BY
John J. McGlew
ATTORNEY

SWIVEL CONNECTOR

BACKGROUND OF THE INVENTION

1. Field of the Invention

This invention relates in general to the construction of swivel connectors and in particular to a new and useful swivel connector particularly for the passage of a cable therethrough which includes interengageable conduit parts having through passages and bodies with surfaces which permit rotatable swivel movement of one in respect to the other and which are held together by a securing element such as a screw which is located in a position offset from the conduit passages when they are aligned.

2. Description of the Prior Art

Prior to the present invention it was known to provide pivotal connectors which may be used to either pipe conduits or for the passage of elements therethrough such as electrical cables and which were held together, for example, by a threaded connection such as a bolt in a manner such that the bolt extended directly through the passage defined by the individual tubular conduit elements of each connector piece. A disadvantage of such a connector is that it was difficult to pass the cable through the device in view of the fact that it must be threaded around the clamping element clamping the two connector pieces together.

SUMMARY OF THE INVENTION

The present invention is an improvement over the prior art particularly in respect to the provision of a connector particularly for the passage of a cable therethrough which includes means for clamping two connector pieces together in a manner such that the clamping means is located offset from the passages defined by the two tubular portions of the connectors themselves. In the preferred form the connector pieces each include a part which is rotatable in respect to another part and which is interengaged therewith and with a body portion forming a rotatable part which is offset from the tubular portions leading into the body portion so that the two tubular portions of the completely fitted connector parts may be aligned for the passage of a device therethrough at a location which is offset from the elements holding the connectors in an assembly, for example, such as a threaded bolt which is threaded into one part and engaged with the other.

Accordingly it is an object of the invention to provide an improved connector construction particularly for the passage of pipes therethrough to tubular conduit elements which are pivotal in respect to the other so that they may be oriented at different angles from each other and wherein the passages communicate through a body portion which is joined together by a threaded bolt which is offset from the passages so that it does not interfere with the passages of the connecting cables therethrough.

A further object of the invention is to provide a connector which is simple in design, rugged in construction, and economical to manufacture.

The various features of novelty which characterize the invention are pointed out with particularity in the claims annexed to and forming a part of this disclosure. For a better understanding of the invention, its operating advantages and specific objects attained by its uses, reference should be had to the accompanying drawing and descriptive matter in which there are illustrated preferred embodiments of the invention.

GENERAL DESCRIPTION OF THE PREFERRED EMBODIMENTS

Figure 1:
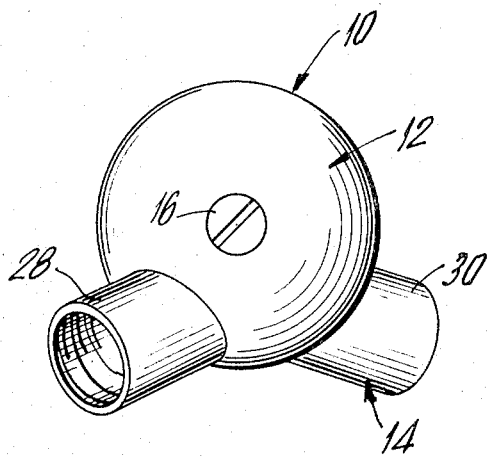
FIG. 1 is a top perspective view of a connector constructed in accordance with the invention.
Figure 2:
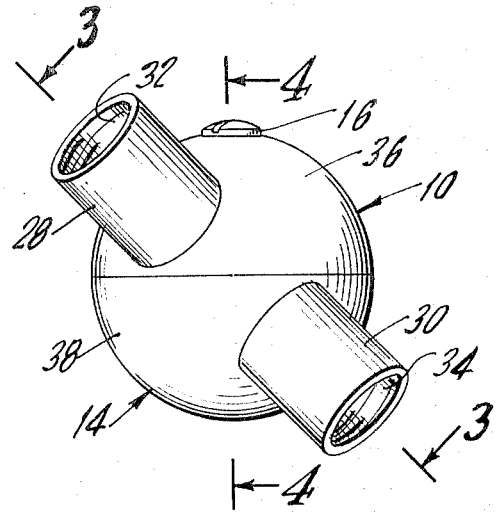
FIG. 2 is an end perspective view of the connector indicated in FIG. 1.
Figure 3:
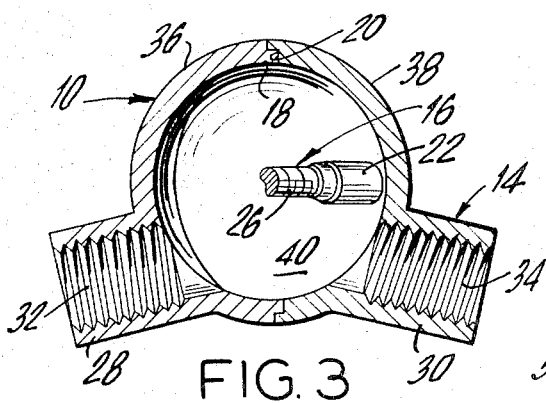
FIG. 3 is a section taken along the line 3—3 of FIG. 2.
Figure 4:
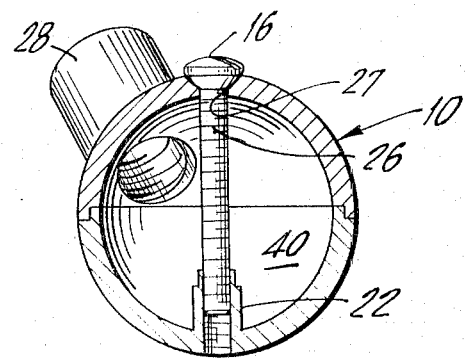
FIG. 4 is a section taken along the line 4—4 of FIG. 2.

Referring to the drawings, in particular, the invention embodied therein in FIGS. 1–4 comprises a connector generally designated 10 which includes a first connector part or connector piece generally designated 12, and a second connector piece generally designated 14 which are rotatably interfitted so that they can pivot relatively about an arc of 360° and they are clamped together by clamping means such as a threaded bolt 16 which extends through the axis of the pivotal rotatable movement. As shown in FIG. 3, the connector 10 includes an interior annular rib 18 which engages within a recess 20 of the part 14 in order to form a tight seal and the two parts are rotatable about the surfaces of the interengaged rib and recess parts. The clamping means includes an internally threaded sleeve 22 on the part 14 which is engaged by a bolt 24 having a threaded end 26 which is engaged in an opening 27 of the part 10.

In accordance with the invention, the connector part 10 includes a tubular conduit portion 28 which may be aligned with the tubular conduit portion 30 of the part 14 and internal passages 32 and 34 of these tubular conduits communicate through a body defined by curved portions or spherical bodies 36 and 38 respectively of the parts 10 and 14 at a location where they are offset from the bolt 24 so that the securing means does not in any respect interfere with the through communication of the passages 32 and 34, through the interior chamber 40 defined within the bodies 36 and 38. This is so because the bodies 36 and 38 which form the chamber 40 are eccentrically arranged in respect to the tubular conduits 28 and 38.

Figure 5:
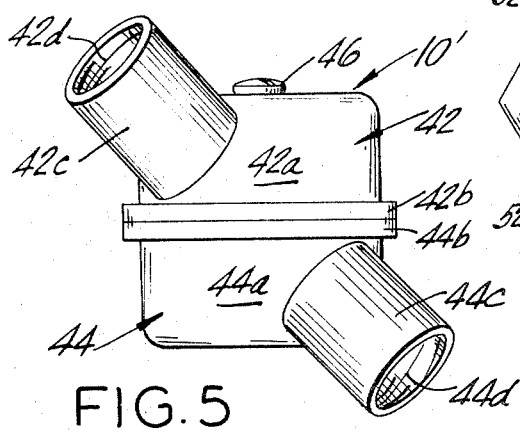
FIG. 5 is a view similar to FIG. 2 of another embodiment of the invention.

In the embodiment of the invention shown in FIG. 5 there is provided a cable swivel connector generally designated 10' which includes a first connector part generally designated 42 and a second connector part generally designated 44. The connector parts 42 and 44 include body portions 42a and 44a which have annular flanges 42b and 44b which fit together and are rotatable in respect to each other. In addition, the connector parts 42 and 44 include tubular conduit parts 42c and 44c having passages 42d and 44d which communicate with the interior of the body parts. In accordance with the invention, the passages 42d and 44d are offset from the securing means in the form of a through bolt 46 which is rotatable in the part 42 and which is threaded into the part 44. The securing bolt 46 has an axis which aligns with the swivel axis of the two parts and the two parts may be rotated up to 360° relative to each other.

Figure 6:
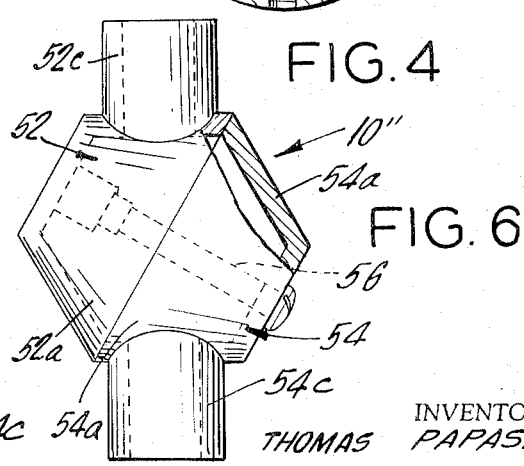
FIG. 6 is a side elevational view partly in section of still another embodiment of the invention.

The embodiment of FIG. 6 includes a connector 10'' including two connector parts, a first part generally designated 52 and a second part generally designated 54. In this arrangement, the first part 52 includes a body portion 52a which is of frusto-conical configuration which mates with a body portion 54a and is rotatable about a plane of rotation which extends normal to a securing bolt 56. The first and second parts include respective tubular conduit parts 52c and 54c through which, for example, a cable may pass and which is arranged offset to the body parts 52a and 54a so that the bolt 56 is always out of alignment with the passages of the tubular conduit parts and with the continuation of these parts inside the body portion.

Figure 7:
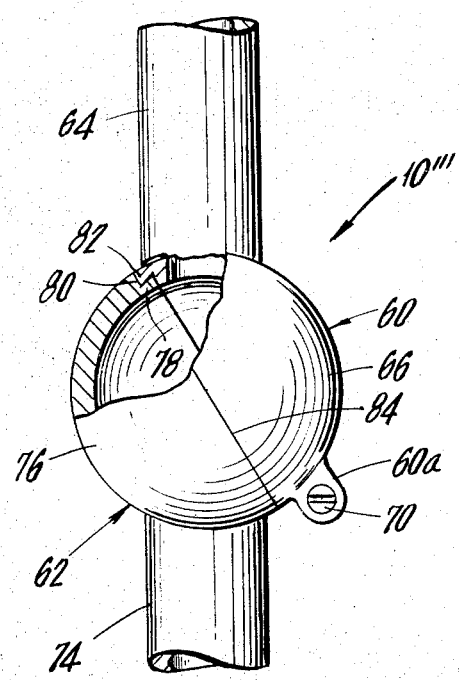
FIG. 7 is a top plan view partly broken away of another embodiment of the swivel connector.
Figure 8:
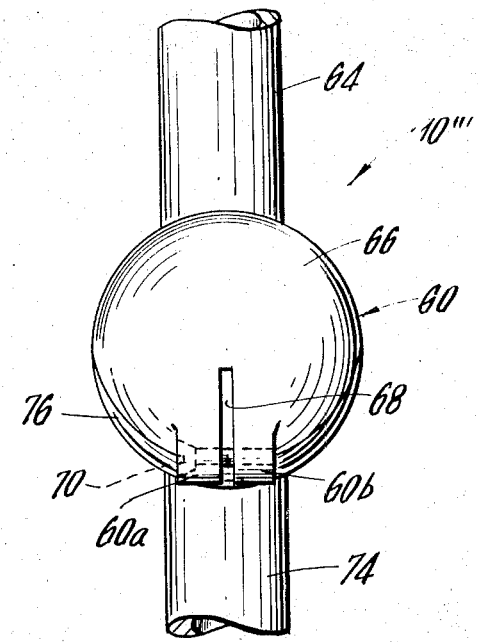
FIG. 8 is a side elevational view of the embodiment shown in FIG. 7.

In the embodiment shown in FIGS. 7 and 8, a swivel connector 10''' includes a first pivotal part 60 and a second pivotal part 62. The first pivotal part 60 includes a conduit portion 64 and a body or hemispherical portion 66 formed as a clamping member with a slot 68 at the end thereof opposite to the connecting conduit 64 which may be sprung together by a clamping bolt 70 which extends through a threaded bore and each of the two separable adjacent parts or legs 60a and 60b. The second part 62 includes a conduit portion 74 and a body or hemispherical portion 76 which includes an inner annular rotational lip 78 forming an undercut portion 80 into which a projecting lip 82 of the first part 60 extends. When the clamping screw 70 is tightened the two parts 60 and 62 interengage and rotate freely together about the rotational plane 84 without separation. With the construction of FIGS. 7 and 8, the conduits 64 and 74 may be concentrically arranged and aligned in respect to the associated body parts 66 and 76. This is true because the clamping means in the form of the screw 70 and the separated parts 60a and 60b with the intermediate slot 68 do not extend through the hemispherical portion so that they do not interfere with the passage of a connecting wire cable through the conduits 62 and 64 and through the hemispherical portion.

Figure 9:
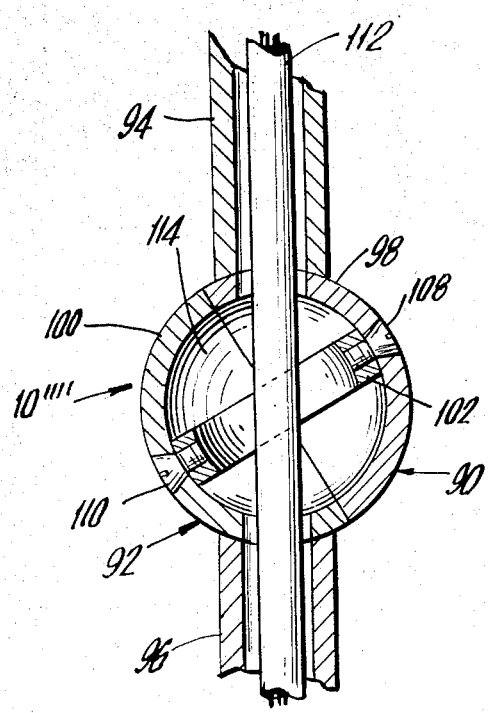
FIG. 9 is a transverse sectional view of still another embodiment of swivel connector.
Figures 10, 11:
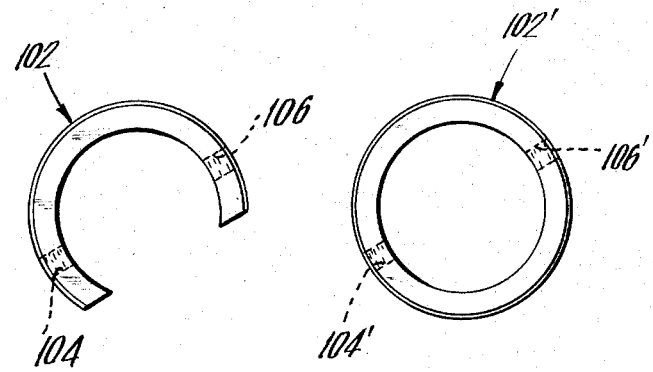
FIG. 10 is a side elevational view of a C-shaped connecting piece for the swivel connector shown in FIG. 9.
FIG. 11 is a side elevational view of a ring-shaped connecting piece.

In the embodiment shown in FIGS. 9 and 10, there is provided a swivel connector generally designated 10''''. In this construction, there are two parts, a first part generally designated 90 and a second part generally designated 92 having respective first and second conduit portions 94 and 96 which may be aligned in a concentric manner with respect to the first and second hemispherical portions 98 and 100. This is so because the clamping means comprises either a C-shaped member 102 as shown in FIG. 10, or a ring-shaped member 102 as shown in FIG. 11. Each member has threaded bores 104 and 106 (104', 106') which align with openings on the hemispherical parts 98 and 100 into which securing bolts 108 and 110 are passed.

In the constructions of FIGS. 9 and 10 or 11, it is also possible to provide a pivotal connector with the passageway extending from the conduit 94 to the conduit 96 through the hemispherical parts 98 and 100 in a condition in which the conduits are aligned concentrically but in which the clamping means does not interfere with the passage of a cable therethrough. As shown in FIG. 9, a cable 112 may pass through the conduit 94, the hemispherical portion which defines the hemispherical chamber 114 and the conduit 96 without having to be passed around the clamping means. The parts 108 and 110 may be pivoted relative to each other in order to orient the conduits 94 and 96 at an angle to each other in the same manner as in the other embodiments.

While specific embodiments of the invention have been shown and described in detail to illustrate the application of the principles of the invention, it will be understood that the invention may be embodied otherwise without departing from such principles.

What is claimed is:

1. A swivel connector comprising a first connector part including a first body portion and a first tubular conduit portion having a passage extending through the conduit portion and into the body portion from one side thereof, a second connector part including a second body portion which is rotatably interengaged with said first body portion and a second tubular conduit portion having a passage extending into said second body portion from the opposite side thereof and communicating through said first body portion with the passage of said first tubular conduit portion of said first connector part, and a clamping member clamping said first and second connector parts together extending through said body portions, said first and second tubular conduit portions extending outwardly from respective opposite sides of said body portion and the passages therethrough being alignable through the interior of said first and second body portions in one rotative position thereof but being offset from the center of said body portions and from said clamping member so that the passages through said first and second tubular conduit portions and the interior of said first and second body portions is not blocked by said clamping member.

2. A swivel connector according to claim 1, wherein said body portions are hemispherical.

3. A swivel connector according to claim 1, wherein said body portions are pot shaped.

4. A swivel connector according to claim 1, wherein said body portions are frusto-conical.

5. A swivel connector according to claim 1, wherein said clamping member includes a threaded bolt member extending through said first connector part and threaded into said second connector part and having an axis which is offset from the passages of said tubular conduit portions of said first and second connector parts.

6. A swivel connector comprising a first connector part including a first body portion and a first tubular conduit portion having a passage extending through the conduit portion and into the body portion from one side thereof, a second connector part including a second body portion which is rotatably interengaged with said first body portion and a second tubular conduit portion having a passage extending into said second body portion from the opposite side thereof and communicating through said first body portion with the passage of said first tubular conduit portion of said first connector part, and a clamping member clamping said first and second connector parts together extending through at least one of said body portions, said first and second tubular conduit portions extending outwardly from respective opposite sides of said body portion and the passages therethrough being alignable through the interior of said first and second body portions in one rotative position thereof but being offset from the center of said body portions and from said clamping member so that the passages through said first and second tubular conduit portions and the interior of said first and second body portions is not blocked by said clamping member, a slot formed in said first connector part, said first connector part having two leg portions on each side of said slot with bores in the leg portions which are aligned, said clamping member comprising a clamping bolt threaded into the aligned bores and tightening said leg portions on each side of said slot to clamp said first connector part to said second connector part.

7. A swivel connector, according to claim 6, wherein said second connector part has a rotational surface with an inner lip and said first connector part includes an outer lip extending outwardly of said first connector part lip and being clamped therearound by said threaded bolt to support said first connector part for rotation in respect to said second connector part.

8. A swivel connector comprising a first connector part including a first body portion and a first tubular conduit portion having a passage extending through the conduit portion and into the body portion, a second connector part including a second body portion which is rotatably interengaged with said first body portion and a second tubular conduit portion having a passage extending into said second body portion and adapted to communicate through said first body portion with the passage of said first tubular conduit portion of said first connector part, and clamping means clamping said first and second connector parts together extending through said body portions, and being located in a position offset from said first and second tubular conduit portions and the connection between said first and second conduit portions through said first and second body portions, said body portions of said first and second connector parts interfitting and forming an interior cavity with said first and second tubular conduit portions extending outwardly from respective opposite sides of the cavity and with their passages communicating through said cavity, said clamping means comprising an internal clamp member arranged adjacent the interior walls of said body parts of said first and second connector parts and having two diamtrically opposite threaded bores, said body parts of said first and second connector parts having bores aligned with respective threaded bores of said clamping member, and a securing screw extending through each of the bores of said first and second connector body parts into the clamping member for interconnecting said body parts for pivotal rotation, said clamp member being offset from the center of the cavity formed by said body parts when said tubular conduits are aligned.

9. A swivel connector, according to claim 8, wherein said body parts are hemispherical, said clamp member comprising a ring.

10. A swivel connector comprising a first connector part including an enlarged body portion having an annular swivel surface and a first tubular conduit portion having a passage extending through said first tubular conduit portion and into said body portion, a second connector part including an enlarged body portion having an annular swivel surface engaged with annular swivel surface of said first body portion and a first second tubular conduit portion having a passage extending into said body portion and adapted to communicate through said body portion of said first connector part and the passage of said first tubular conduit portion of said first connector part, and clamping means clamping said first and second connector parts together for pivotal rotation in respect to each other and located within and to one side of the interior of said body portion out of line with the passages of said first and second conduit portions and the communication therebetween at the interior of said body portion when said first and second conduit portions are aligned so as not to interfere with the passage of the cable through a passage of one conduit portion through the interior of said body portion and out the passage of the other body portion.

* * * * *